M. ZAWISTOWSKI.
BASE FOR CLOTH CUTTING MACHINES.
APPLICATION FILED APR. 19, 1920.
1,378,163.
Patented May 17, 1921.
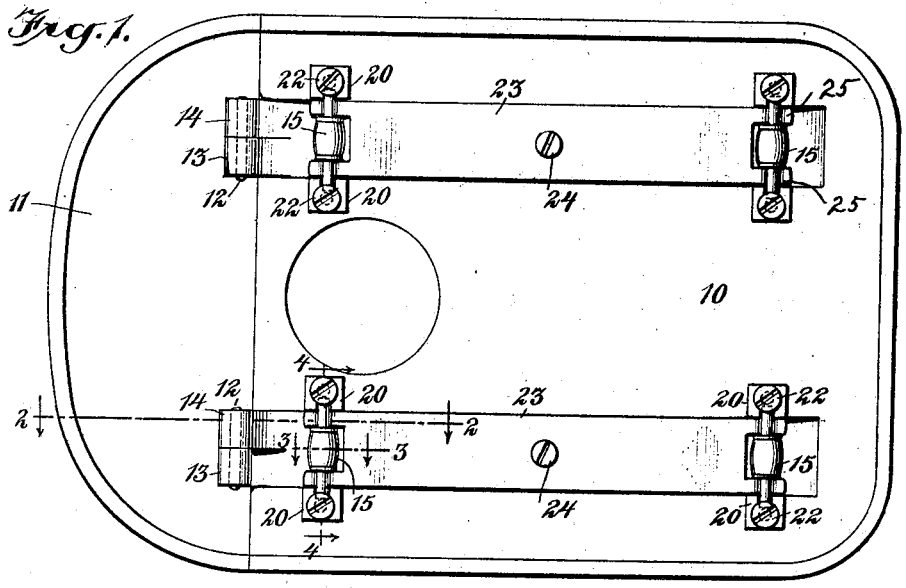
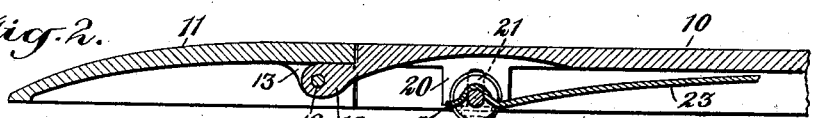
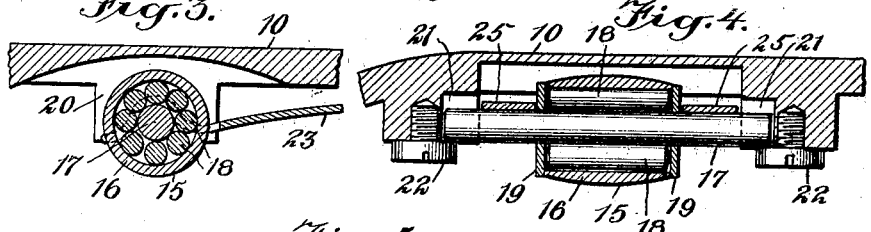
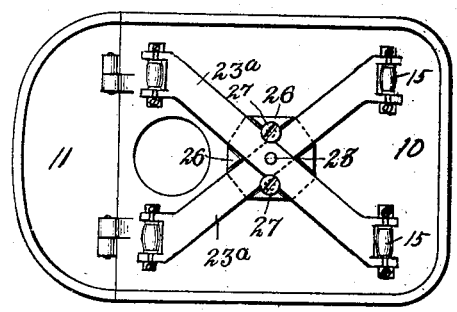
Inventor
Martin Zawistowski
By his Attorney

UNITED STATES PATENT OFFICE.

MARTIN ZAWISTOWSKI, OF BROOKLYN, NEW YORK.

BASE FOR CLOTH-CUTTING MACHINES.

1,378,163.   Specification of Letters Patent.   Patented May 17, 1921.

Application filed April 19, 1920. Serial No. 374,805.

*To all whom it may concern:*

Be it known that I, MARTIN ZAWISTOWSKI, a citizen of the United States, and resident of Brooklyn, in the county of Kings and State of New York, have invented certain new and useful Improvements in Bases for Cloth-Cutting Machines, of which the following is a specification.

The ordinary cloth cutting machine as now manufactured is provided with a base serving to support the motor, knife, and other operating and guiding parts, and is adapted to be advanced along the cutting table beneath the layers of material to be cut as the knife is guided to follow the pattern or desired line. To facilitate free sliding movement of the base, it is customarily provided with supporting rollers or other antifriction supporting means. In those machines, having a reciprocating knife, as distinguished from a rotary one, there is commonly provided flat springs or other resilient connections between the rollers and the base to cushion the base and prevent vibration of the machine from causing the base to knock or pound against the cutting table and thereby interfere with the guiding or controlling of the machine by the operator. Such a construction is shown in the expired patent to Wright 722,475 issued March 10th, 1903.

The cutting of the cloth often produces a very fine lint, some of which passes to the under side of the base and to the bearings or journals of the rollers, where in time it often interferes with, or even positively prevents the rotation of the rollers.

My invention relates to bases for reciprocating knife machines of the resiliently and roller support type and the main objects of my invention are to simplify the construction, reduce the cost of manufacture and assembly, facilitate removal or separation of the parts for cleaning, replacement or repair, and more effectively guide and control the relative vertical movements of the rollers and the base.

In my improved construction, the rollers are carried directly by the base and are readily removable therefrom and the springs are independently connected to the base and act to press the rollers downwardly instead of serving as a connection between the rollers and the base. The springs are so constructed that they hold the rollers in proper assembly, but permit of the separation of the parts for cleaning, replacement or repair upon the removal of the rollers from the base independently of any removal of the springs.

In the accompanying drawings:

Figure 1 is an inverted plan view of a base construction in accordance with my invention;

Figs. 2, 3, and 4 are sections on the lines 2—2, 3—3 and 4—4 respectively of Fig. 1; and Fig. 5 is an inverted plan view of a modified form.

In my improved construction I provide a base 10 which may be of the proper size and proportions for the machine to be supported. The base may have a smooth upper surface for sliding engagement beneath the material to be cut and may have its edge portions curved downwardly so as to provide a comparatively shallow chamber beneath the base with the edges of the base closely adjacent to but possibly slightly spaced above the table. The front end of the base may include a relatively movable section 11 pivotally connected to the body of the base so that the front edge of this section 11 may tilt and properly slide beneath the material irrespective of any slight variations in the elevation of the main body of the base. I have shown these two sections connected by pivot pins 12 extending through corresponding pairs of lugs 13 and 14.

The main section of the base may be provided with any desired number of supporting rollers. I have shown four such rollers 15, each including a cylindrical or barrel shaped shell 16 rotatably mounted on an axle 17 by means of an annular row of bearing rollers 18. Thus the main supporting roller 15 may freely rotate on the axle 17 indepenedently of any rotation of the latter. The axle carries a pair of washers or end plates 19 loosely mounted thereon and of slightly less diameter than the maximum external diameter of the supporting roller 16 but of greater diameter than the internal diameter of said supporting roller, whereby they hold the supporting roller and bearing rollers against relative endwise movement. These end plates may be loosely mounted on the axle 17 and freely rotatable thereon and held against longitudinal movement on the axle by the spring, as hereinafter more particularly pointed out.

The base carries a pair of depending lugs 20 rigidly connected thereto or integrally formed therewith and spaced apart to a distance materially greater than the length of the roller 15, but less than the length of the axle 17. The pair of lugs have opposed vertical slots in the surfaces facing toward each other and of a width approximately equal to or very slightly greater than the diameter of the end portions of the axle 17. The axle is mounted in these slots and vertically guided by them and held against any material endwise movement by the inner surfaces of the grooves. For closing or partially closing the lower ends of the grooves to prevent the axle from dropping out when the base is lifted and to facilitate the removal of the axle and roller when desired, I provide removable stops which are shown in the form of screws 22 threaded into the lugs or bearing blocks 20 and having portions projecting at least part way across the lower ends of the corresponding grooves. These screws are shown as extending upwardly into the lower ends of the lugs with comparatively large heads partially closing the lower ends of the grooves.

For pressing the rollers downwardly and resisting, but permitting relative vertical movement of the axles and base with its guiding grooves, I provide flat springs which may assume various different forms. In Fig. 1, there is shown a pair of springs 23, each of which has its intermediate portion engaging directly with the base and its terminal portions acting upon two separate rollers. The spring may be held against longitudinal movement by any suitable stop although preferably it is held by a screw 24 which also retains the spring in position on the base independently of the removal of the rollers. The spring has its terminal portion of a width substantially equal to the distance between the two lugs 20 and has two prongs or extensions 25 spaced apart to leave a recess of a width approximately equal to the length of the roller 15. Thus the two prongs or extensions 25 may be placed between the two lugs at the opposite ends of the roller and between the axle and the under surface of the base. The spring is given such an initial set that both ends press downwardly and normally hold the rollers at the lower ends of their guiding slots 21. At the same time the prongs prevent any endwise separation or bodily movement of the rollers or the separate parts thereof. The prongs are illustrated as being provided with transverse corrugations or grooves which receive the axle, but this is comparatively unimportant if other means be provided for preventing endwise movement of the springs.

As the rollers are not carried by the springs but are merely pressed downwardly by them, it will be evident that any rearward thrust on the rollers during the advancement of the base will be resisted by the solid lugs 20 rather than by the springs. It will also be noted that the rollers are not directly carried by, or secured to the springs so that upon removal of the screws 22, or possibly only one of them, any roller and its axle may be removed without disturbing the spring otherwise than relieving the pressure thereon. It will also be noted that upon the removal of the roller, the end plates 19 of the latter are released and the separate parts of the roller may be very easily separated to remove any lint or dust which may be worked in between the end plates 19 and the ends of the roller 16 to interfere with the free rotation of the bearing rollers 18. All of the parts of the roller are freely separable upon the bodily removal of the roller from the base.

I have shown only two springs for the four rollers, each spring being secured intermediate of its ends and acting on two rollers, but it will, of course, be evident that this is not essential as the two ends of the spring 23 may be made of separate pieces of material independently secured to the base.

The springs should be made of such stiffness and initial set as will normally hold the rollers down to their limiting positions or rather support the base to the desired height above the cutting table. They should not be so stiff as to prevent proper absorbing of the jar or vibration caused by the reciprocation of the knife and other working parts of the machine.

In the form shown in Fig. 1, the length of the springs is determined by the distance between the front and rear rollers. In order to give the springs somewhat greater length and to provide a single securing means for both springs, I may form them as shown in Fig. 5. Here each spring 23$^a$ acts upon two diagonally opposite rollers, the two springs being connected together if desired by a rivet 25 at their point of crossing. The two springs may be secured to the center portion of the base, which latter may have depending lugs or shoulders 28 to prevent lateral movement or turning of the spring about the pivot 25. One or more of these lugs or shoulders 28 may carry a screw 27 so positioned and with a head of sufficient size to overlap the one or both of the springs, thus rigidly securing the center portions of both springs to the base. The terminal portions of these springs may be constructed and operated in the same manner as the spring shown in Fig. 1.

Having thus described my invention what I claim as new and desire to secure by Letters Patent is:

1. A base for reciprocating-knife cloth cutting machines having a pair of depending lugs rigid therewith and provided with vertical slots, stops at the lower ends of said slots, a roller having an axle vertically movable in said slots and a spring engaging with said base and having portions engaging with said axle between the ends of said roller and said lugs for resiliently pressing said axle downwardly away from the body of said base and toward said stops.

2. A base for reciprocating-knife cloth cutting machines having a body portion presenting a pair of opposed substantially vertical slots, a roller having an axle vertically movable in said slots, a spring engaging with said base and with said axle at the ends of said roller for resiliently pressing said axle downwardly, and means at the lower end of said slots for limiting the downward movement of said axle.

3. A base for bodily movable machines carrying vibratory parts, including a roller having an axle, guiding means carried by said base and engaging with said axle to permit relative vertical movement of the axle and base, and a flat spring having a portion engaging with said base and having separate extensions at one end thereof for engagement with said axle at opposite ends of said roller to resiliently resist but permit downward movement of said base in respect to said axle.

4. A base for portable machines carrying vibratory parts, including a pair of rollers, each having an axle, vertical guiding means carried by said base for engagement with each end portion of each axle and a spring having its intermediate portions secured to said base and its opposite end portions engaging with the upper sides of both of said axles at opposite ends of said rollers for yieldingly resisting but permitting movement of said axles along said guiding means.

5. A base for portable machines carrying vibratory parts, including a pair of rollers, each having an axle, vertical guiding means carried by said base for engagement with each end portion of each axle, a spring having its intermediate portions secured to said base and its opposite end portions engaging with both of said axles at opposite ends of said rollers between the latter and said guiding means for yieldingly resisting but permitting movement of said axles along said guiding means, and means for preventing endwise movement of said spring.

6. A base for portable machines carrying vibratory parts, including a supporting roller having an axle, an outer barrel or shell, bearing rollers intermediate of said axle and shell and of substantially the same length as the latter, end plates carried by said axle at the ends of said bearing rollers and shell, sliding connections between the ends of said axle and said base, and means engaging with said axle for normally preventing relative endwise movement of said end plates, bearing rollers and shell, and resiliently resisting relative vertical movement of said axle and base.

7. A base for portable machines carrying reciprocatory parts, including a supporting roller having an axle, an outer shell, an annular row of bearing rollers and annular plates engaging with the ends of said bearing rollers and shell, said parts being freely separable upon removal from said base, detachable means for connecting said rollers to said base and permitting of limited relative vertical movement, and separate means for preventing relative endwise movement of the parts of said supporting roller while attached to said base.

8. A base for portable machines having vibratory parts, including a pair of rollers each including a plurality of separable parts, vertical guiding means for connecting said rollers to said base and a single leaf spring having its intermediate portion engaging with said base and its terminal portions serving to prevent relative endwise movement of the parts of said rollers and yieldingly resisting but permitting relative vertical movement of said rollers and base.

9. A base having a pair of rollers secured to the under side thereof and vertically movable in respect thereto and a leaf spring having its intermediate portion engaging with the under side of said base and having each end provided with a pair of prongs for detachably engaging the side of the axle roller toward the base to press the roller away from the base, said prongs being spaced apart to form a recess receiving the body of the roller.

Signed at New York in the county of New York and State of New York this 13th day of April A. D. 1920.

MARTIN ZAWISTOWSKI.